US010091833B2

United States Patent
Lee et al.

(10) Patent No.: US 10,091,833 B2
(45) Date of Patent: *Oct. 2, 2018

(54) METHOD AND APPARATUS FOR CONTROLLING UPLINK TRANSMISSION ON DISCONTINUOUS RECEPTION OPERATION IN WIRELESS COMMUNICATION SYSTEM

(71) Applicant: LG ELECTRONICS INC., Seoul (KR)

(72) Inventors: Sunyoung Lee, Seoul (KR); Sungjun Park, Seoul (KR); Seungjune Yi, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,092

(22) Filed: Nov. 14, 2017

(65) Prior Publication Data

US 2018/0084602 A1 Mar. 22, 2018

Related U.S. Application Data

(63) Continuation of application No. 15/397,449, filed on Jan. 3, 2017, now Pat. No. 9,839,067, which is a (Continued)

(51) Int. Cl.
*H04W 76/28* (2018.01)
*H04L 12/58* (2006.01)
(Continued)

(52) U.S. Cl.
CPC .......... *H04W 76/28* (2018.02); *H04L 5/0048* (2013.01); *H04L 5/0053* (2013.01); *H04L 51/00* (2013.01);
(Continued)

(58) Field of Classification Search
CPC . H04W 76/28; H04W 76/48; H04W 52/0209; H04W 72/0413; Y02D 70/00;
(Continued)

(56) References Cited

U.S. PATENT DOCUMENTS

| 2011/0188428 A1 | 8/2011 | Ishii |
| 2011/0237266 A1 | 9/2011 | Cai |

(Continued)

FOREIGN PATENT DOCUMENTS

| JP | 2014-528196 A | 10/2014 |
| KR | 10-2011-0044875 A | 5/2011 |

OTHER PUBLICATIONS

Ericsson et al., Periodic CSI and SRS at DRX state change, R2-122668, 3GPP TSG-RAN WG2 #78, Prague, Czech Republic, May 21-25, 2012 (http://www.3gpp.org/ftp/tsg_ran/WG2_RL2/TSGR2_78/Docs/).

(Continued)

*Primary Examiner* — Ajay Cattungal
(74) *Attorney, Agent, or Firm* — Birch, Stewart, Kolasch & Birch, LLP

(57) ABSTRACT

A method for controlling uplink transmissions on discontinuous reception (DRX) operation, by a wireless device, in a wireless communication system, the method includes configuring a channel quality indicator (CQI) masking which indicates that channel state information is to be reported on a physical uplink control channel (PUCCH) while an onDurationTimer is running; determining, at a first subframe prior to a second subframe, whether or not the onDurationTimer is to be running at the second subframe according to whether or not a physical downlink control channel (PDCCH) is received at the first subframe; and controlling the uplink transmissions so as not to report the channel state information on the PUCCH at the second (Continued)

subframe if the onDurationTimer is determined, at the first subframe, to be not running at the second subframe, wherein the channel state information includes at least one of a CQI, a precoding matrix index (PMI).

12 Claims, 11 Drawing Sheets

Related U.S. Application Data continuation of application No. 14/413,666, filed as application No. PCT/KR2013/006066 on Jul. 8, 2013, now Pat. No. 9,565,714.

(60) Provisional application No. 61/669,618, filed on Jul. 9, 2012.

(51) Int. Cl.
*H04W 72/04* (2009.01)
*H04L 5/00* (2006.01)
*H04W 76/04* (2009.01)
*H04W 52/02* (2009.01)

(52) U.S. Cl.
CPC ... *H04W 52/0209* (2013.01); *H04W 72/0413* (2013.01); *H04W 76/048* (2013.01); *Y02B 60/50* (2013.01); *Y02D 70/00* (2018.01)

(58) Field of Classification Search
CPC ......... H04L 51/00; H04L 5/0053; H04L 5/00; H04L 5/0048; Y02B 60/50
See application file for complete search history.

(56) References Cited

U.S. PATENT DOCUMENTS

| | | | |
|---|---|---|---|
| 2011/0294491 A1* | 12/2011 | Fong | H04L 5/001 455/422.1 |
| 2012/0170497 A1 | 7/2012 | Zhang et al. | |
| 2012/0178445 A1* | 7/2012 | Dalsgaard | H04W 72/02 455/434 |
| 2013/0114484 A1* | 5/2013 | Suzuki | H04W 68/025 370/311 |
| 2013/0114573 A1* | 5/2013 | Suzuki | H04L 1/1887 370/336 |
| 2013/0182626 A1* | 7/2013 | Kuo | H04W 52/0216 370/311 |
| 2013/0272138 A1* | 10/2013 | Ou | H04W 76/18 370/241 |
| 2014/0198701 A1 | 7/2014 | Östergaard et al. | |
| 2014/0286240 A1* | 9/2014 | Kim | H04W 56/0005 370/328 |

OTHER PUBLICATIONS

Samsung, Discussion on CQI/SRS transmission during DRX, R2-114180, 3GPP TSG-RAN2 #75 meeting, Athens, Greece, Aug. 22-26, 2011 (http://www.3gpp.org/ftp/tsg_ran/WG2_RL2/TSGR2_75/docs/).

"LTE; Evolved Universal Terrestrial Radio Access (E-UTRA); Medium Access Control (MAC) protocol specification (3GPP TS 36.321 version 10.5.0 Release 10)", ETSI TS 136 321 vol. 10.5.0, Mar. 1, 2012, pp. 1-55, XP014070089.

3GPP, "3rd Generation Partnership Project; Technical Specification Group Radio Access Network; Evolved Universal Terrestrial Radio Access (E-UTRA); Medium Access Control (MAC) protocol specification (Release 10)," 3GPP TS 36.321 V10.5.0, Mar. 2012, 5 pages.

* cited by examiner

METHOD AND APPARATUS FOR CONTROLLING UPLINK TRANSMISSION ON DISCONTINUOUS RECEPTION OPERATION IN WIRELESS COMMUNICATION SYSTEM

CROSS-REFERENCE TO RELATED APPLICATIONS

This Application is a Continuation of U.S. patent application Ser. No. 15/397,449 filed on Jan. 3, 2017 (now U.S. Pat. No. 9,839,067 issued on Dec. 5, 2017), which is a Continuation of U.S. patent application Ser. No. 14/413,666 filed on Jan. 8, 2015 (now U.S. Pat. No. 9,565,714 issued on Feb. 7, 2017), which is the National Phase of PCT International Application No. PCT/KR2013/006066 filed on Jul. 8, 2013, which claims the benefit under 35 U.S.C. § 119(e) to U.S. Provisional Application No. 61/669,618 filed on Jul. 9, 2012, all of which are hereby expressly incorporated by reference into the present application.

BACKGROUND OF THE INVENTION

Field of the Invention

The present invention relates to wireless communications, and more particularly, to a method and apparatus for controlling uplink transmissions on DRX operation in a wireless communication system.

Discussion of the Related Art

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Discontinuous reception (DRX) is a method for reducing battery consumption by allowing a user equipment (UE) to discontinuously monitor a downlink channel. When the DRX is configured, the UE discontinuously monitors the downlink channel. Otherwise, the UE continuously monitors the downlink channel.

Recently, many applications require an always-on characteristic. Always-on is a characteristic in which the UE is always connected to a network so as to directly transmit data whenever necessary.

However, since battery consumption is great when the UE continuously maintains the network connection, a proper DRX is configured in a corresponding application to guarantee the always-on characteristic while reducing battery consumption.

Recently, several various applications are running in parallel in one UE, and thus it is not easy to configure one DRX suitable for all of the applications. This is because, even if an optimal DRX is configured for a specific application, it may be a not proper DRX configuration with respect to other applications which are running in parallel.

There is a need for a method for operating the DRX in a more flexible manner and especially, it may be necessary for controlling uplink transmission setup by upper layer on DRX operation.

SUMMARY OF THE INVENTION

The present invention provides a method and apparatus for controlling uplink transmissions on DRX operation in a wireless communication system.

The present invention further provides a method and apparatus for controlling selective CQI/PMI/RI/PTI reports on PUCCH and/or a periodic SRS transmission on DRX operation in a wireless communication system.

The present invention further provides a method and apparatus for controlling to not send uplink reports with restriction on DRX operation in a wireless communication system.

The present invention provides a method and apparatus for applying DRX operation with short DRX cycle in a wireless communication system.

In an aspect, a method for controlling uplink transmissions on DRX operation in a wireless communication system is provided. The method includes determining, at a subframe n−k, whether an onDurationTimer is to be active at a subframe n or not, and choosing that a Channel Quality Indicator (CQI)/Precoding Matrix Index (PMI)/Rank Indicator (RI)/Precoding Type Indicator (PTI) on a Physical Uplink Control Channel (PUCCH) are not reported at the subframe n if the onDurationTimer is determined to be not active at the sub-frame n.

The method may further include determining that a periodic-Sounding Reference Signal (SRS) transmission is not transmitted at the sub-frame n if the onDurationTimer is determined to be not active at the sub-frame n.

The method may further include choosing that at least one CQI/PMI/RI/PTI on a PUCCH or a periodic SRS is reported at the subframe n when the drxShortCycleTimer was not started in the preparation time.

In another aspect, a wireless device for controlling uplink transmissions on DRX operation in a wireless communication system is provided. The wireless device includes a radio frequency unit configured to receive a radio signal and a processor operatively coupled with the radio frequency unit. The processor is configured to determine, at a subframe n−k, whether an onDurationTimer is to be active at a subframe n or not and choose that a Channel Quality Indicator (CQI)/Precoding Matrix Index (PMI)/Rank Indicator (RI)/Precoding Type Indicator (PTI) on a Physical Uplink Control Channel (PUCCH) are not reported at the subframe n if the onDurationTimer is determined to be not active at the sub-frame.

Discontinuous reception (DRX) can be configured flexibly and a sending of CSI/SRS reports between the UE and the eNB can be complied with accurately. More details, the UE does not send CQI/PMI/RI/PTI reports on PUCCH and/or type-0-triggered SRS transmissions in a processing time even though onDurationTimer with a short DRX cycle is running. The CQI/PMI/RI/PTI reports on PUCCH and/or type-0-triggered SRS transmissions are needed to prepare with the processing time enough before the onDurationTimer starts. Therefore, the UE checks at a subframe n−i, whether the onDurationTimer is to be active at a sub-frame n so as to control selective CQI/PMI/RI/PTI report on PUCCH and/or a periodic SRS transmission on the DRX operation. Decoding complexity from the eNB side can be reduced because a proper uplink transmission on DRX operation is configured so that the eNB is able to discern whether the UE performs a CQI/PMI/RI/PTI report on PUCCH and/or a periodic SRS transmission or not.

DETAILED DESCRIPTION OF THE EMBODIMENTS

Figure 1:
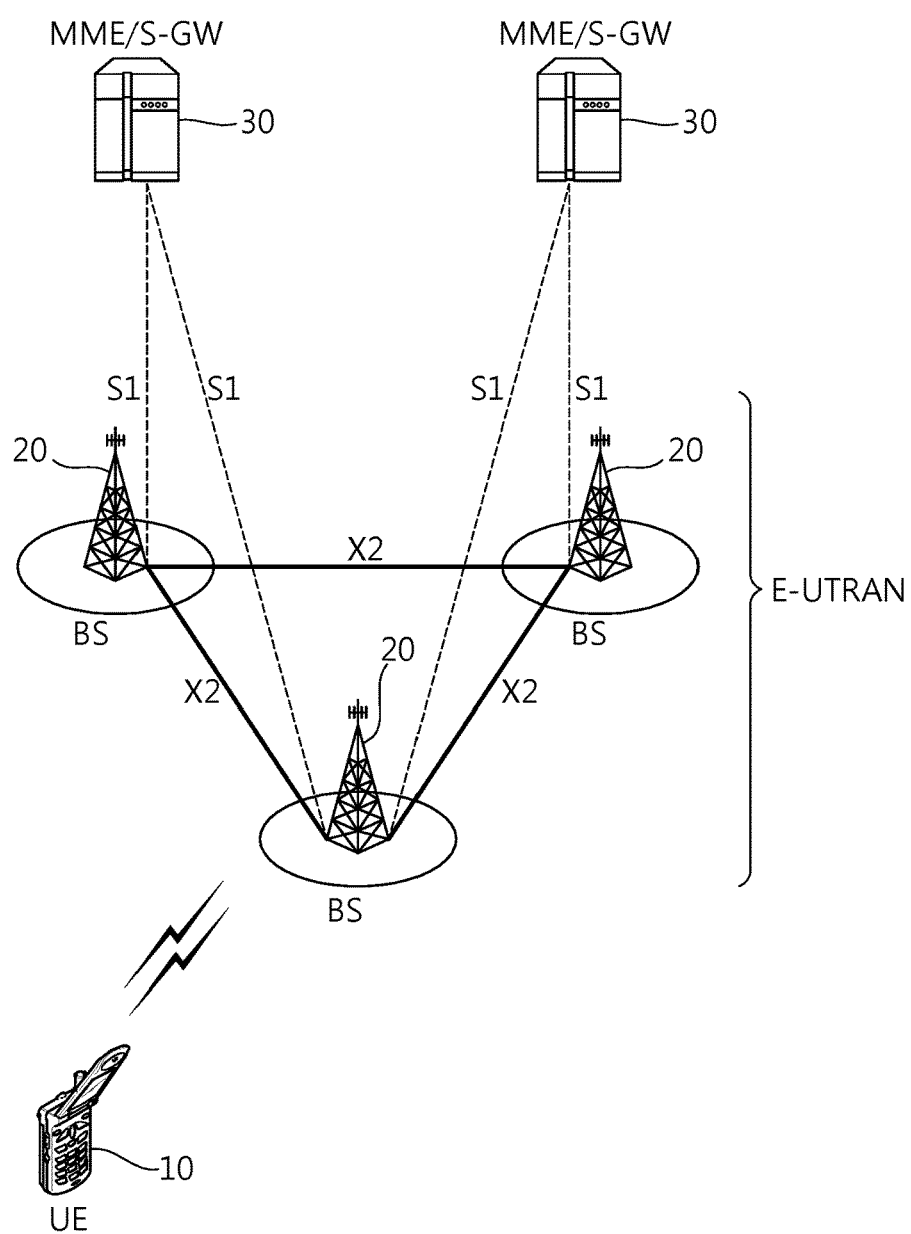
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
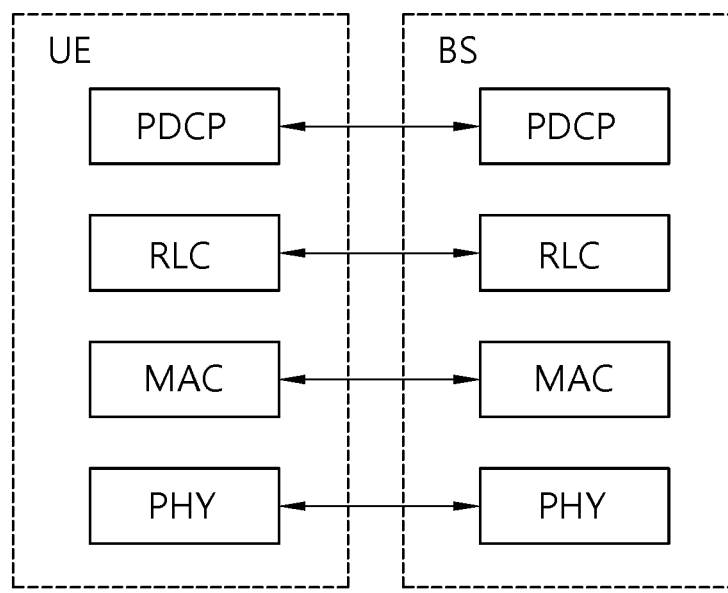
FIG. 2 is a diagram showing a radio protocol architecture for a user plane to which the present invention is applied.
Figure 3:
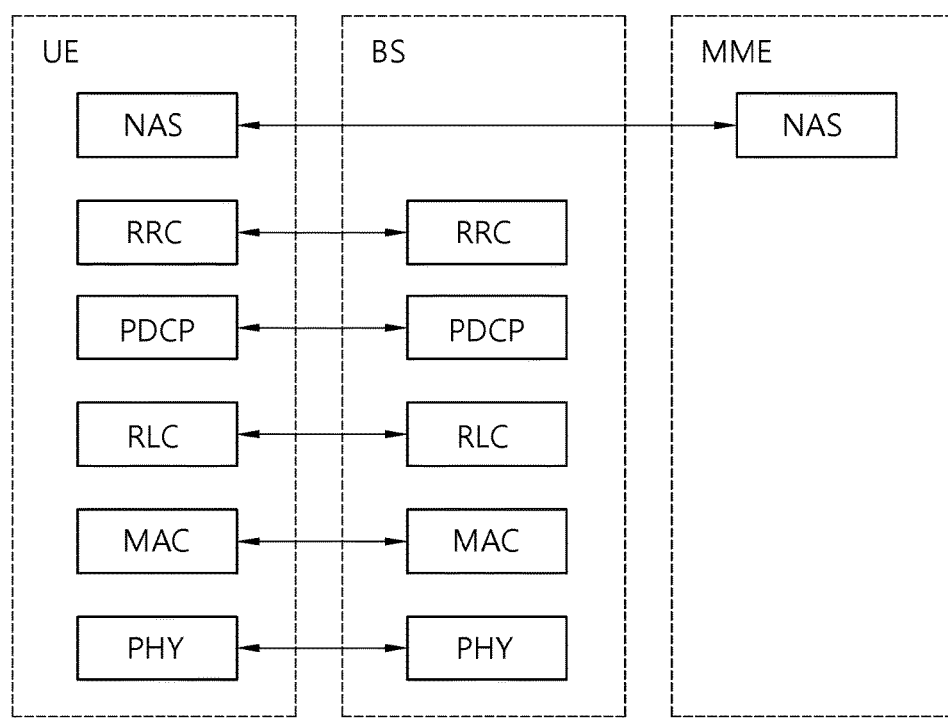
FIG. 3 is a diagram showing a radio protocol architecture for a control plane. to which the present invention is applied to which the present invention is applied

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

The 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PDCCH is a downlink control channel, and is also called a scheduling channel in a sense that it carries scheduling information. Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

The wireless communication system as 3GPP LTE of the present invention uses blind decoding for PDCCH detection. The blind decoding is a scheme in which a desired identifier is de-masked from a CRC of a PDCCH (referred to as a candidate PDCCH) to determine whether the PDCCH is its own channel by performing CRC error checking.

A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH.

Now, discontinuous reception (DRX) in a wireless communication system, as example, 3GPP LTE will be described.

The DRX is a method for reducing battery consumption of a UE by allowing the UE to discontinuously monitor a downlink channel.

Figure 4:
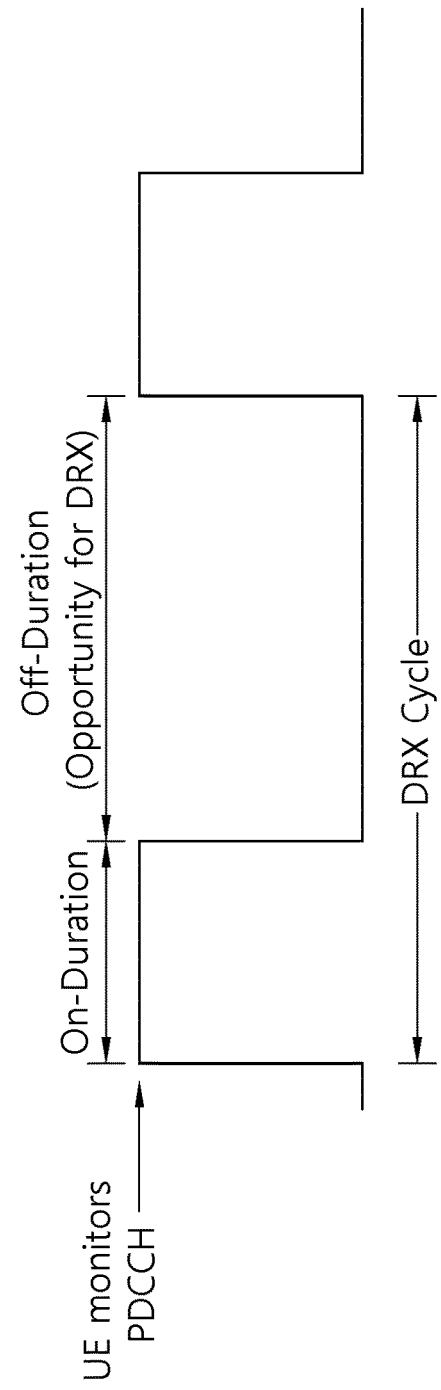
FIG. 4 shows a DRX cycle to which the present invention is applied.

FIG. 4 shows a DRX cycle to which the present invention is applied.

A DRX cycle specifies the periodic repetition of the on-duration followed by a possible period of inactivity. The DRX cyclic includes an on-duration and an off-duration. The on-duration is a duration in which a UE monitors a PDCCH within the DRX cycle. The DRX cycle has two types, i.e., a long DRX cycle and a short DRX cycle. The long DRX cycle which has a long period can minimize battery consumption of the UE. The short DRX cyclic which has a short period can minimize a data transmission delay.

When the DRX is configured, the UE may monitor the PDCCH only in the on-duration and may not monitor the PDCCH in the off-duration.

An onDurationTimer is used to define the on-duration. The on-duration can be defined as a duration in which the onDurationTimer is running. The onDurationTimer may specify the number of consecutive PDCCH-subframe(s) at the beginning of a DRX Cycle. The PDCCH-subframe specifies a subframe in which the PDCCH is monitored.

In addition to the DRX cycle, a duration in which the PDCCH is monitored can be further defined. A duration in which the PDCCH is monitored is collectively referred to as an active time.

A drx-Inactivity timer deactivates the DRX. If the drx-Inactivity timer is running, the UE continuously monitors the PDCCH irrespective of the DRX cycle. The drx-Inactivity timer starts upon receiving an initial UL grant or DL grant on the PDCCH. The drx-Inactivity timer may specify the number of consecutive PDCCH-subframe(s) after successfully decoding a PDCCH indicating an initial UL or DL user data transmission for this UE.

A HARQ RTT timer defines a minimum duration in which the UE expects HARQ retransmission. The HARQ RTT timer may specify the minimum amount of subframe(s) before a DL HARQ retransmission is expected by the UE.

A drx-Retransmission timer defines a duration in which the UE monitors the PDCCH while expecting DL retransmission. The drx-Retransmission timer may specify the maximum number of consecutive PDCCH-subframe(s) for as soon as a DL retransmission is expected by the UE. After initial DL transmission, the UE starts the HARQ RTT timer. When an error is detected for the initial DL transmission, the UE transmits NACK to a BS, stops the HARQ RTT timer, and runs the drx-Retransmission timer. The UE monitors the PDCCH for DL retransmission from the BS while the drx-Retransmission timer is running.

An Active Time can include an on-duration in which the PDCCH is periodically monitored and a duration in which the PDCCH is monitored due to an event occurrence.

When a DRX cycle is configured, the Active Time includes the time while:

onDurationTimer or drx-Inactivity timer or drx-Retransmission timer or mac-ContentionResolution timer is running; or a Scheduling Request is sent on PUCCH and is pending; or an uplink grant for a pending HARQ retransmission can occur and there is data in the corresponding HARQ buffer; or a PDCCH indicating a new transmission addressed to the C-RNTI of the UE has not been received after successful reception of a Random Access Response for the preamble not selected by the UE.

Figure 5:
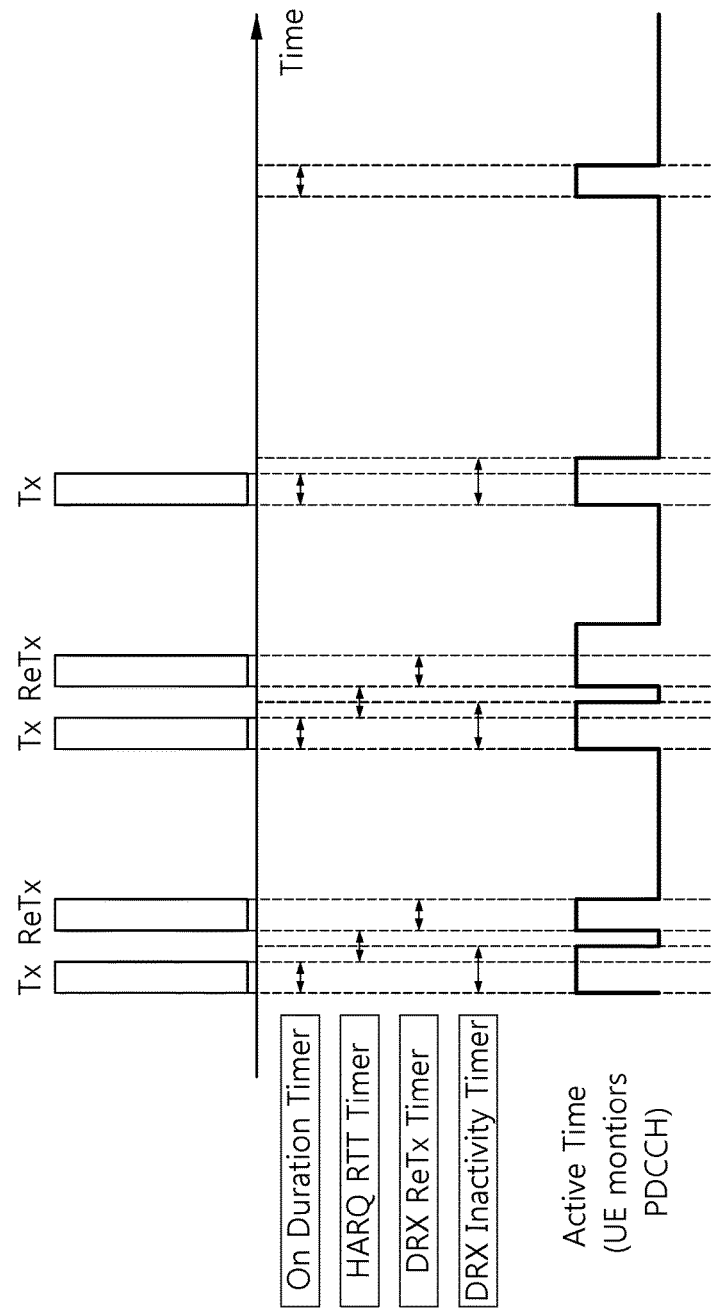
FIG. 5 shows active time for DRX operation to which the present invention is applied.

FIG. 5 shows active time for DRX operation to which the present invention is applied.

When DRX is configured, the UE shall for each subframe:
if a HARQ RTT Timer expires in this subframe and the data of the corresponding HARQ process was not successfully decoded:
start the drx-Retransmission timer for the corresponding HARQ process.
if a DRX Command MAC CE (control element) is received:
stop onDurationTimer and drx-Inactivity timer.
if drx-InactivityTimer expires or a DRX Command MAC CE is received in this subframe:
if the Short DRX cycle is configured:
start or restart drx-ShortCycle timer and use the Short DRX Cycle.
else:
use the Long DRX cycle.
if drx-ShortCycle timer expires in this subframe:
use the Long DRX cycle.
If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
start onDurationTimer.
during the Active Time, for a PDCCH-subframe, if the subframe is not required for uplink transmission for half-duplex FDD UE operation and if the subframe is not part of a configured measurement gap:
monitor the PDCCH;
if the PDCCH indicates a DL transmission or if a DL assignment has been configured for this subframe:
start the HARQ RTT timer for the corresponding HARQ process;
stop the drx-Retransmission timer for the corresponding HARQ process.
if the PDCCH indicates a new transmission (DL or UL):
start or restart drx-Inactivity timer.
when not in Active Time, type-0-triggered SRS shall not be reported.
if CQI masking (cqi-Mask) is setup by upper layers:
when onDurationTimer is not running, CQI/PMI/RI/PTI on PUCCH shall not be reported.
else:
when not in Active Time, CQI/PMI/RI/PTI on PUCCH shall not be reported.

As mentioned, the active-time is defined a total duration that the UE is awake. This includes the on-duration of the DRX cycle, the time UE is performing continuous reception while the inactivity timer has not expired and the time UE is performing continuous reception while waiting for a DL retransmission after one HARQ RTT. Based on the above the minimum active time is of length equal to on-duration, and the maximum is undefined (infinite).

Figure 6:
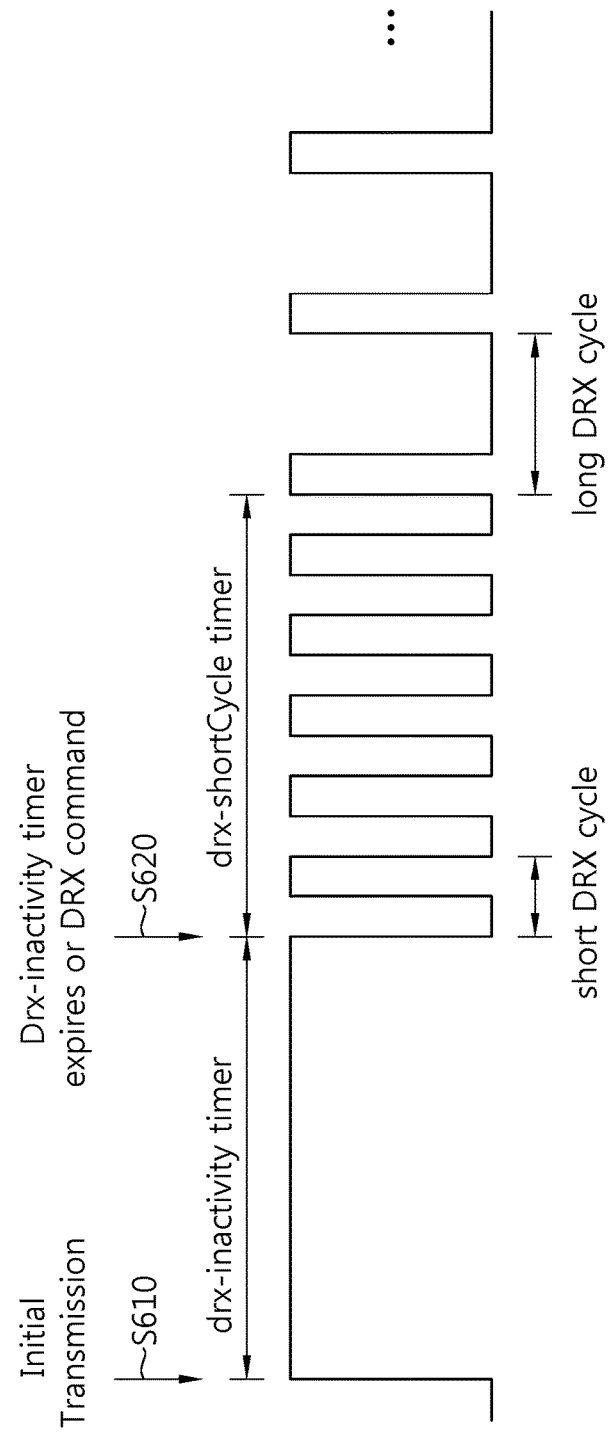
FIG. 6 shows an example of a transition of a DRX cycle to which the present invention is applied.

FIG. 6 shows an example of a transition of a DRX cycle to which the present invention is applied.

Upon receiving initial transmission from an eNB, a drx-Inactivity timer (also referred to as a first timer or an inactivity timer) starts (step S610). A UE continuously monitors a PDCCH while the drx-Inactivity timer is running.

If the drx-Inactivity timer expires or if a DRX command is received from the eNB, the UE transitions to a short DRX cycle (step S620). Then, the drx-shortCycle timer (also referred to as a second timer or a DRX cycle timer) starts.

The DRX command can be transmitted as a MAC CE, and can be called a DRX indicator that indicates a transition to the DRX. The DRX command MAC CE is identified through a long channel ID (LCID) of a MAC PDU subheader.

While the drx-shortCycle timer is running, the UE operates in the short DRX cycle. If the drx-shortCycle timer expires, the UE transitions to a long DRX cycle.

If the short DRX cyclic is pre-set, the UE transitions to the short DRX cycle. If the short DRX cyclic is not pre-set, the UE can transition to the long DRX cycle.

A value of HARQ RTT timer is fixed to 8 ms (or 8 subframes). Other timer values (i.e., an onDurationTimer, a drx-Inactivity timer, a drx-Retransmission timer, a mac-ContentionResolution timer, etc.) can be determined by the eNB through an RRC message. The eNB can configure the long DRX cycle and the short DRX cycle through the RRC message.

Meanwhile, the UE is faced to not send the CSI/SRS reports but it should report the CSI/SRS transmission at On Duration with the system rule after configuring the DRX operation and the CSI/SRS transmission configurations. Hence, the present invention proposes a scheme that the UE controls to not perform CSI and SRS transmission in case of the UE does not expect the On Duration. Accordingly, there is an advantage in that the complexity of a BS attributable to uncertainty regarding whether or not the CSI and SRS transmission at On Duration can be reduced.

Figure 7:
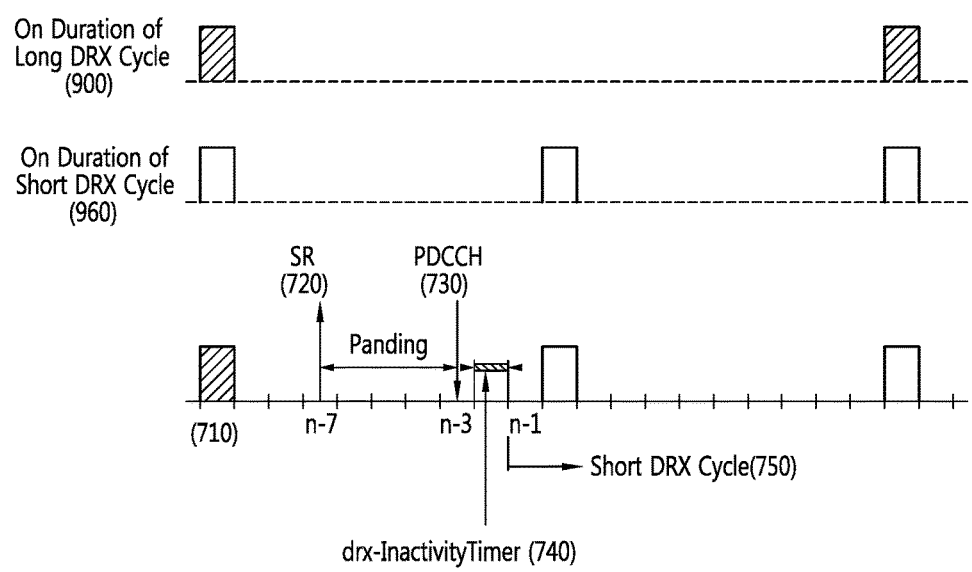
FIG. 7 shows an error of CQI/PMI/RI/PTI reports on PUCCH and/or type-0-triggered SRS transmissions on DRX operation which the present invention is applied.

FIG. 7 shows an example of an error of CQI/PMI/RI/PTI reports on PUCCH and/or a type-0-triggered SRS transmission with the DRX operation which wireless communication system is applied, i.e., the situation where the UE does not prepare for the uplink transmission since the On Duration with the DRX operation is not predicted by the short time after receiving a PDCCH.

Referring to FIG. 7, the UE is configured to use both a Short DRX Cycle (700) and a Long DRX cycle (760) for the DRX operation; the UE uses the Long DRX Cycle for the DRX operation (700). That is the DRX operation includes monitoring a PDCCH at On Duration operated with the Long DRX Cycle (710).

The UE sends a Scheduling Request message to the BS in a subframe #n-7(720) and receives a PDCCH from the BS in a subframe #n-3, as a response of the Scheduling Request (730). An Active time includes from the subframe #n-7 to subframe #n-3. The Active time can be included to subframe #n-2 since a drx-InactivityTimer is runs with 1 ms as a predetermined length after receiving the PDCCH at the #n-3. That is When the UE receives the PDCCH in the (n-3)th subframe, an (n-2)th subframe becomes an active time by drx-InactivityTimer set to 1 UE. When the drx-InactivityTimer expires with the predetermined 1 ms (740), the UE stats using the Short DRX cycle from a subframe #n-1(750).

According to the receiving the DRX configuration and the PDDCH after, the #n subframe is the On Duration of the short DRX cycle (760), in this time, the UE should transmit the CSI and SRS transmission at the #n subframe as following the previous configuration as the CSI/SRS configuration. More details, the UE has defined to perform the CSI and SRS transmission only during On Duration since the CSI/SRS transmission configuration is set with CQI masking (cqi-Mask) from the BS by a defined system rule.

Herein, if time of 5 ms is taken for the UE to process the received PDCCH and prepare UL transmission for the CSI/SRS transmission, the UE cannot perform the CSI/SRS transmission in the subframe #n in the case of FIG. 7. Because the UE does not predict that the nth subframe as the On Duration is not considered at the (n-5)th subframe, that is, the (n−5)th subframe before the nth subframe in which the CSI and SRS transmission did not need to be perform them (the CSI and SRS report) and thus the UE has not prepared UL transmission for the nth subframe.

There is a need to solve that the UE processes a received PDCCH in order to perform UL transmission depending on an implementation of the UE, and several times (e.g., 1 to 5 ms) of the UE can be taken in a process of preparing the UL transmission and the UE does not comply with the CSI and SRS transmission in the On Duration owing to the time taken by the process of preparing the UL transmission although it has to perform the CSI and SRS transmission. This invention propose that the UE can control to perform the CSI and SRS transmission selectively to not report the CSI and SRS transmission when the UE has not predicted the On Duration in which time enough to prepare UL transmission has been reserved.

In the other hand, the UE can perform the CSI and SRS transmission in the nth subframe only when the UE has previously predicted that the nth subframe is on-duration in the (n−5)th subframe and has prepared the CSI and SRS transmission. Accordingly, the UE can control to perform the CSI and SRS transmission in the On Duration during a DRX operation, when the UE checks to perform the CSI and SRS transmission in a specific subframe depending on whether the UE has predicted on-duration in the specific subframe in the state in which time enough to prepare UL transmission has been reserved.

Accordingly, there is an advantage for the BS, because complexity in implementing the BS is decreased. The following FIG. 8 explains a control operation of this invention with more detailed.

Figure 8:
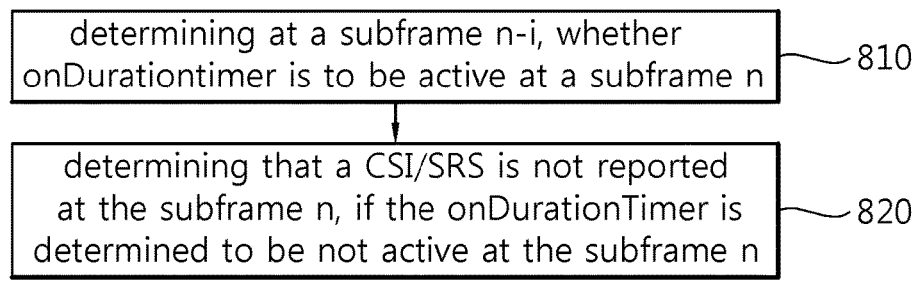
FIG. 8 shows a flowchart for controlling uplink controlling uplink transmissions on DRX operation according to an exemplary embodiment of the present invention.

FIG. 8 shows an example of a solution for CQI/PMI/RI/PTI reports on PUCCH and/or type-0-triggered SRS transmissions on DRX operation according to an exemplary embodiment of the present invention.

Referring to FIG. 8, the present invention proposes a scheme in which an UE controls to not report a CSI and SRS transmission to the BS although onDurationTimer is active to run (be running) in a specific subframe (820), if the UE predicted that the onDurationTimer is not driven in the specific subframe in a subframe prior to the specific subframe (810).

That is, UE can control to not perform the CSI and SRS reports as a uplink transmission on the specific subframe when the UE expected the time not enough to prepare the UL transmission the subframe before even though the onDurationTimer is active to run in the specific subframe at that time. According to, the UE controls the CSI and SRS reports selectively at the specific subframe by checking whether the onDurationTimer is expected to be active at a specific subframe or not using radio resource allocation information and timers of configuration for the DRX operation from the specific subframe to a subframe prior to the specific subframe if the onDurationTimer runs in the specific subframe.

Herein, the BS transmits a RRC signal to set the UE to the configuration for a DRX operation and the configuration for CSI/SRS transmission. Of course, the CSI transmission and SRS transmission are set by the BS, which are limited to the operation of the UE related to the CSI transmission with CQI masking (cqi-Mask) scheme and periodic SRS transmission. The CSI transmission includes a transmission of CQI/PMI/RI/PTI on a PUCCH, which is the configuration sets to transmit at On Duration of the DRX cycle. Also, the UE provides an uplink state by periodically sending a Sounding Reference Signal (SRS), and this periodic SRS transmission is called a type-0-triggered SRS. The SRS transmission according to the present invention includes the limitation to type-0-triggered SRS.

The BS uses that a Preparation Time is defined as a certain number of consecutive subframes before the UE starts onDurationTimer and the UE is configured to use Preparation Time by receiving the number of consecutive subframes of the Preparation Time by an RRC signaling or a MAC signaling, or the UE is set the Preparation Time as the number of consecutive subframes to the known value with the BS.

Herein the BS sets that a Preparation Time defined as a certain number of consecutive subframes before the UE starts onDurationTimer and the UE is configured to use Preparation Time by receiving the number of consecutive subframes of the Preparation Time by an RRC signaling or a MAC signaling, or the UE sets the Preparation Time as the number of consecutive subframes to the known value with the BS. For example, the Preparation Time includes the subframes #n−i to #n−1 before onDurationTimer is started at the subframe #n. The UE receives the value of i by an RRC or a MAC signaling or sets the value of i to the known value.

If the driving of drxShortCycleTimer is not started within the preparation time, it is determined that the UE has predicted that onDurationTimer will be active in the specific subframe. If the driving of drxShortCycleTimer is started within the preparation time, it is determined that the UE has not predicted that onDurationTimer will be active in the specific subframe.

For example, if onDurationTimer is being driven in an nth subframe, a preparation time is set to an (n−3)th subframe to an (n−1)th subframe, and drxShortCycleTimer starts being driven in an (n−4)th subframe, it is determined that an UE has predicted that onDurationTimer will be active to run in the nth subframe. If drxShortCycleTimer starts being driven in the (n−3)th subframe, it is determined that an UE has not predicted that onDurationTimer will be active to run in the nth subframe.

If drxShortCycleTimer starts being driving within the preparation time, the UE determines whether or not to perform CSI and SRS transmission in a specific subframe by taking the time taken for the UE to prepare UL transmission into consideration.

The BS can determine a Processing time that can be set to one or more continuous subframes after sending radio resource allocation information to the UE and set the Processing time for the UE using an RRC signaling or a MAC signaling. The UE receives the number of consecutive subframes as the Processing Time by an RRC signaling or a MAC signaling or The UE sets the number of consecutive subframes as the Processing Time to the known value.

The Processing Time is defined as a certain number of consecutive subframes after the UE starts drx-InactivityTimer, the Processing Time is set by an RRC signaling or a MAC signaling, or with UE sets the predetermined value to the Processing Time.

For example, the Processing Time includes the subframes #m+1 to #m+j after drx-InactivityTimer is started at the subframe #m. The UE receives the value of j by an RRC or a MAC signaling or sets the value of j to the known value.

The UE can receive the radio resource allocation information from the BS through a PDCCH. When receiving the radio resource allocation information, the UE starts a drx-InactivityTimer. That is, the Processing time correspond to one or more continuous subframes after the drx-InactivityTimer starts being driven. The UE checks whether the drxShortCycleTimer has started being driven within the Preparation time. If, as a result of the check, it has not been predicted that onDurationTimer will be active in the specific subframe, the UE controls to not perform the CSI and SRS transmission during the processing time set.

Figure 9:
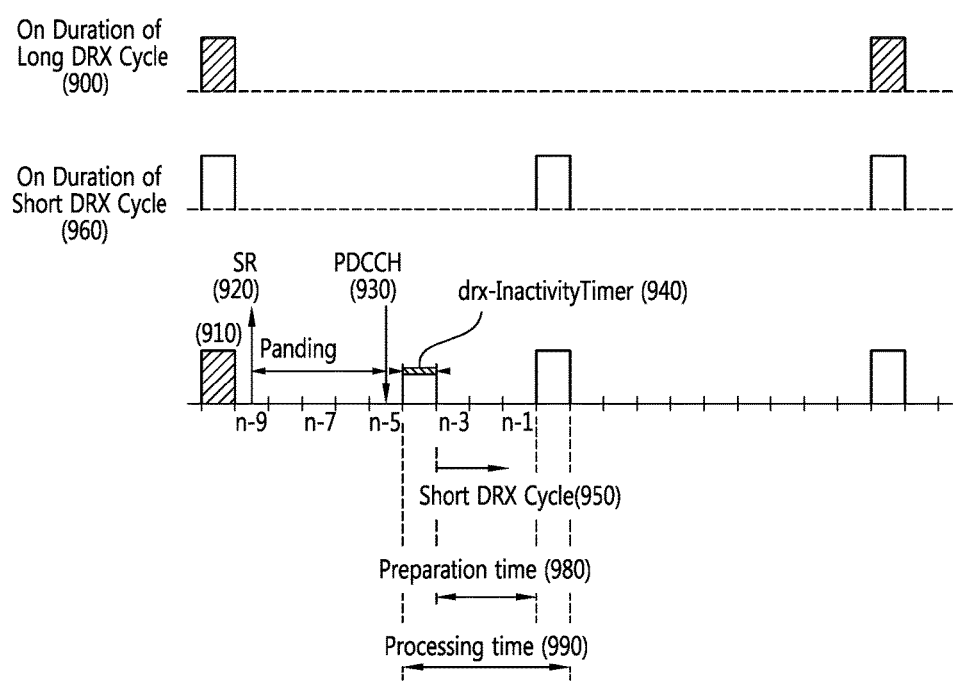
FIG. 9 shows an example of solution to solve the error of CQI/PMI/RI/PTI reports on PUCCH and/or type-0-triggered SRS transmissions on DRX operation according to an exemplary embodiment of the present invention.

FIG. 9 shows an example of a control scheme to not CQI/PMI/RI/PTI reports on PUCCH and/or type-0-triggered SRS transmissions on DRX operation according to an exemplary embodiment of the present invention.

Referring to FIG. 9, if the processing time is set to 5 subframes and drx-InactivityTimer set with 1 ms (subframe) starts in an (n−4)th subframe (940), an nth subframe from the (n−4)th subframe is in the processing time (990). Herein the processing time is depending on the implementation of the UE, is the time that the UE processes a received PDCCH in order to perform UL transmission as and time of several ms (e.g., 1 to 5) can be taken in a process of preparing the UL transmission, in this invention as example discloses that the processing time sets 5 ms.

In this case, if onDurationTimer is being running in the nth subframe (960), a preparation time has been set to an (n−3)th subframe to an (n−1)th subframe (980), and the drxShortCycleTimer has started being run in the (n−3)th subframe, the UE does not perform the CSI and SRS transmission in the current nth subframe because a current nth subframe corresponding to the On-Duration is in the processing time.

Whereas, in other case, if onDurationTimer is being running in the n+1th subframe with the short DRX cycle, a preparation time has been set to an (n−3)th subframe to an (n−1)th subframe, in this case, when the drxShortCycleTimer has started being run in the (n−4)th subframe, the UE can perform the CSI and SRS transmission in the current n+1th subframe because a current n+1th subframe during On-Duration is not in the processing time. That is, the UE determines that it is the enough time as the processing time to prepare the UL transmission report from the n−4 subframe to the n subframe even if the drx-InactivityTimer having a 1 ms length started at the n−4 subframe. So, the UE checks properly operation times of the onDurationTimer and drx-ShortCycleTimer using the DRX configuration.

Therefore, the UE controls to perform the CSI and SRS transmission during the On Duration by predicting that onDurationTimer is active or not in a specific subframe based on the Preparation Time and Processing Time.

Figure 10:
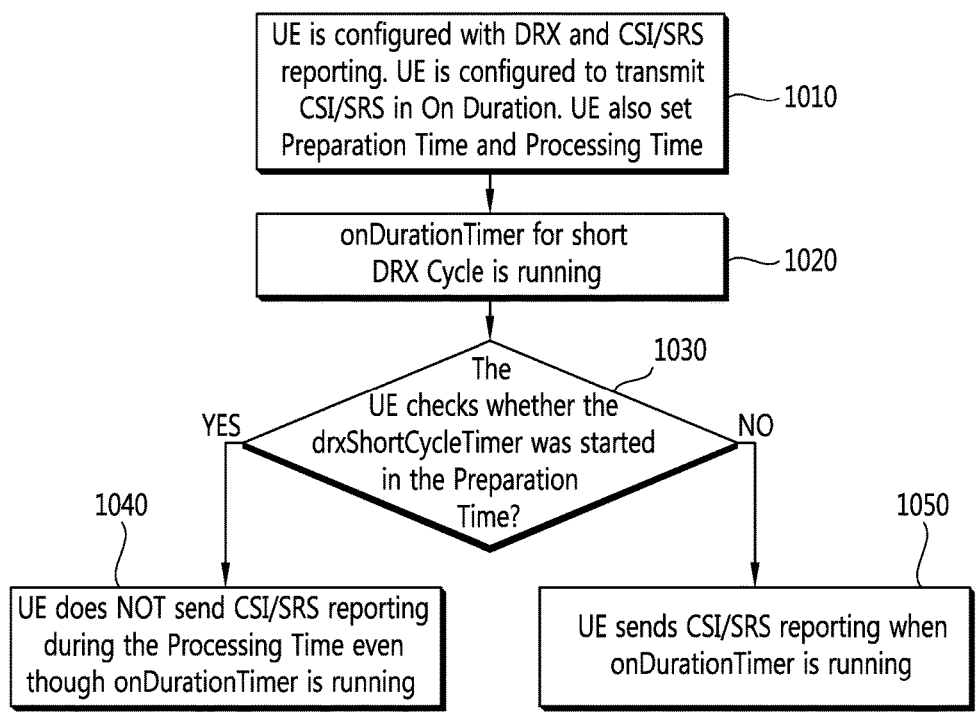
FIG. 10 shows a flowchart for determining CQI/PMI/RI/PTI reports on PUCCH and/or type-0-triggered SRS transmissions on DRX operation according to an exemplary embodiment of the present invention.

FIG. 10 shows a flowchart for determining CQI/PMI/RI/PTI reports on PUCCH and/or type-0-triggered SRS transmissions on DRX operation according to an exemplary embodiment of the present invention.

Referring to FIG. 10, the UE sets configurations related to a DRX configuration and a CSI/SRS transmission (1010). At this 1010 step, the UE can be configured to the CSI/SRS transmission during On-Duration. The CSI/SRS transmission is setup with CQI masking (cqi-Mask) by upper layers, the UE is configured to perform CSI reports during On-Duration, and this periodic SRS transmission called a type-0-triggered SRS is also configured to send during On-Duration. And the UE is also configured to apply the Preparation Time and the Processing Time. For example, the DRX configuration, the CSI/periodic SRS (type-0-triggered SRS), and the Preparation Time and the Processing Time configuration are signaled by an RRC signaling or each RRC signaling corresponding to each configuration. Also these configurations are by an MAC signaling. Especially, the Preparation Time and/or the Processing Time are configured to a predetermined value by UE.

The UE can be configured to use the Short DRX cycle and the long DRX cycle for more efficient DRX operation. If the Short DRX cycle is configured, the UE start or restart drxShortCycleTimer, and uses the Short DRX Cycle. Whereas, if the Short DRX cycle is not configured, the UE uses the Long DRX cycle. When the drxShortCycleTimer expires in a subframe, the UE uses the Long DRX cycle. The UE starts an onDurationTimer at the subframe set by a drxStartOffset using a DRX cycle to be used. If CQI masking (cqi-Mask) is setup by upper layers, when the onDurationTimer is not running, CQI/PMI/RI/PTI on PUCCH shall not be reported. And when not in Active Time, the CQI/PMI/RI/PTI on PUCCH shall not be reported.

The onDurationTimer for the DRX cycle as the Short DRX cycle of the UE is running (1020).

The UE checks whether the drxShortCycleTimer has started being driven within the preparation time in order to check the current subframe is in On Duration (1030). If it is determined that the drxShortCycleTimer was started within the preparation time, it proceeds to 1040. That is, the UE checks whether the drxShortCycleTimer was started in the Preparation Time. For example, if the drx-InactivityTimer was started by receiving a sudden PDCCH and expired within the Preparation Time, then the UE restarts the drxShortCycleTimer within the Preparation Time.

The UE checks whether the current subframe is in the Processing Time (1040). If the current subframe is in a time during the Processing Time, the UE determines the current subframe in not expected to enough time to prepare the UL transmission, so that the UE controls to not send CQI/PMI/RI/PTI reports on PUCCH and/or type-0-triggered SRS transmissions even though the onDurationTimer is running, since the current subframe is not the enough time to prepare to uplink transmission for the CSI/SRS reporting.

During the Processing Time, the UE considers that the onDurationTimer is started unexpectedly, and if the UE started the drxShortCycleTimer in the Preparation Time and is in during the Processing Time, the UE does not send CQI/PMI/RI/PTI reports on PUCCH and/or type-0-triggered SRS transmissions even though the onDurationTimer is running.

Whereas, if the current subframe is not in time during the Processing Time, the UE determines that the current subframe is enough to prepare the UL transmission. The UE controls to perform the CSI/SRS reporting. That is, the UE considers that the onDurationTimer is started as expected, the UE sends CQI/PMI/RI/PTI reports on PUCCH and/or type-0-triggered SRS transmissions during the Processing Time if onDurationTimer is running.

Also, if the UE started the drxShortCycleTimer in the Preparation Time, the UE considers that the onDurationTimer is started expectedly at the current subframe, so that the UE sends CQI/PMI/RI/PTI reports on PUCCH and/or type-0-triggered SRS transmissions during On Duration.

The present invention proposes a scheme in which if an UE has to perform CSI and SRS transmission in a subframe that becomes onDurationTimer, the UE predicts that the onDurationTimer will be active in the subframe and the UE does not perform CSI and SRS transmission at the subframe time after drx-InactivityTimer starts being driven if the UE has not prepared UL transmission. Accordingly, there is an advantage in that the complexity of a BS attributable to uncertainty regarding whether or not the CSI and SRS transmission in on-duration can be reduced.

As described, this invention discloses a rule of the CSI and SRS transmission in a subframe while the onDurationTimer is running, this is that, the UE determines whether the onDurationTimer is to be active at the subframe or not the subframe before, and controls to not report the CSI and SRS transmission with predetermined subframes after the drx-InactivityTimer started if the determined subframe is expected to not enough time to prepare to uplink transmission of the CSI and SRS.

Accordingly, there is an advantage in that the definitions of the Processing Time and the Preparation Time by configuring the BS and the UE is provided, so the complexity of a BS attributable to uncertainty regarding whether or not an UE reports the CSI and SRS transmission in On-Duration can be solved. Therefore, more proper uplink transmission on DRX operation is configured so that the eNB is able to discern whether the UE performs a CQI/PMI/RI/PTI report on PUCCH and/or a periodic SRS transmission or not.

Although the aforementioned embodiment shows the DRX operation of the UE for example, the proposed invention is applicable to a DRX operation of a machine to machine (M2M) device or a machine-type communication (MTC) device. MTC is one type of data communication including one or more entities not requiring human interactions. That is, the MTC refers to the concept of communication performed by a machine device, not a terminal used by a human user, by using the existing wireless communication network. The machine device used in the MTC can be called an MTC device. There are various MTC devices such as a vending machine, a machine of measuring a water level at a dam, etc.

Figure 11:
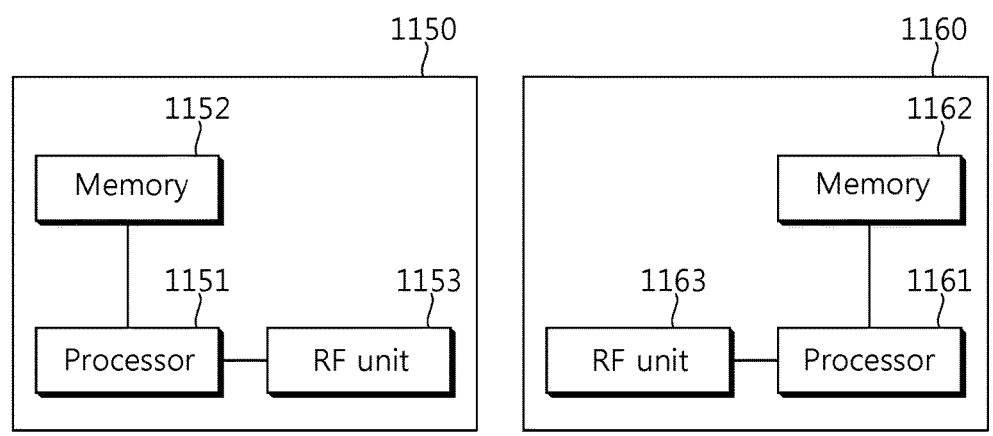
FIG. 11 is a block diagram showing a wireless communication system according to an exemplary embodiment of the present invention.

FIG. 11 is a block diagram showing a wireless communication system according to an embodiment of the present invention.

A BS 1150 includes a processor 1151, a memory 1152, and a radio frequency (RF) unit 1153. The memory 1152 is coupled to the processor 1151, and stores a variety of information for driving the processor 1151. The RF unit 1153 is coupled to the processor 51, and transmits and/or receives a radio signal. The processor 1151 implements the proposed functions, procedures, and/or methods. In the embodiments of FIG. 8 to FIG. 10, the operation of the BS can be implemented by the processor 51.

Especially, the processor 1151 configures and sets the DRX configuration and CSI/SRS transmission configuration with CQI masking on the UE. Herein, the DRX configuration is included to configure a preparation time defined as a certain number of consecutive subframes before the onDurationTimer is active and a processing time defined as a certain number of consecutive subframes after a drx-InactivityTimer was started when the drxShortCycleTimer was started in the preparation time in order to perform the CSI and SRS transmission at the predetermined specific subframe according to the configurations for the DRX operation. The Preparation Time and the Processing Time configuration are signaled by an RRC signaling, an MAC signaling, or especially, a predetermined value by predefined with the UE.

Therefore, the processor 1151 determines whether the UE performs the CSI and SRS transmission at a predetermined subframe or not using the DRX configuration, the CSI/SRS transmission configuration and the Preparation Time and the Processing Time configuration. It is provided that the more proper DRX can be operated in the UE.

A wireless device 1160 includes a processor 1161, a memory 1162, and an RF unit 1163. The memory 1162 is coupled to the processor 1161, and stores a variety of information for driving the processor 1161. The RF unit 1163 is coupled to the processor 1161, and transmits and/or receives a radio signal. The processor 1161 implements the proposed functions, procedures, and/or methods. In the embodiments of the FIG. 8 to FIG. 10, the operation of the UE can be implemented by the processor 1161.

The processor 1161 configures the DRX configuration and the CSI transmission configuration by checking a RRC signaling received by the RF unit 1063. Especially, a Preparation Time and a Processing Time is configured more, that is, the DRX configuration is included to configure the preparation time defined as a certain number of consecutive subframes before the onDurationTimer is active, and the processing time defined as a certain number of consecutive subframes after a drx-InactivityTimer was started when the drxShortCycleTimer was started in the preparation time in order to perform the CSI and SRS transmission at the predetermined specific subframe according to the configurations for the DRX operation.

The Preparation Time and the Processing Time configuration are signaled by an RRC signaling, an MAC signaling, or especially, a predetermined value by predefined with the UE. In other words, processor 1161 also determines the configurations from the one RRC or one MAC signal. Or the processor 1161 can determine each configuration from each RRC or MAC signal or use them as a pre-set value referring to a system rule defined with the BS.

This processor 1161, in order to correctly perform CSI/SRS report at On Duration configured for transmission under the environment of performing the DRX operation, i.e., configured with CQI masking, can selectively control to perform the CSI and SRS transmission.

More details, This processor 1161, controls to report the CSI and SRS transmission with restriction as not to perform the CSI and SRS transmission when it is determined to not enough time to prepare to the CSI and SRS transmission by expecting a DRX operation according to the DRX configuration using the preparation time defined as a certain number of consecutive subframes before the onDurationTimer is active and the processing time defined as a certain number of consecutive subframes after a drx-InactivityTimer was started. The Preparation Time and the Processing Time configuration are signaled by an RRC signaling, an MAC signaling, or especially, a predetermined value by predefined with the BS which recognize the report the CSI and SRS controlled by UE with selective restriction.

Therefore, the processor 1161 controls to perform CSI and SRS transmission selectively in the specific subframe during the On Duration by using the DRX configuration, the CSI/SRS transmission configuration, and additionally configurations of the Preparation Time/Processing Time. More clear and correct DRX operation is provided, so to more proper uplink transmission is performed.

The technical concept of the present invention is based on provisional documents as described in the below.

<Start of Priority Document>

In this invention, if the UE does not expect to start onDurationTimer in the Preparation Time, the UE does not send CQI/PMI/RI/PTI reports on PUCCH and/or type-0-triggered SRS transmissions in the Processing Time even though onDurationTimer is running.

The Preparation Time is defined as a certain number of consecutive subframes before the UE starts onDurationTimer.

The UE receives the number of consecutive subframes by an RRC signaling or a MAC signaling, or The UE sets the number of consecutive subframes to the known value.

For example, the Preparation Time includes the subframes #n−i to #n−1 before onDurationTimer is started at the subframe #n. The UE receives the value of i by an RRC or a MAC signaling or sets the value of i to the known value.

The Processing Time is defined as a certain number of consecutive subframes after the UE starts drx-Inactivity-Timer.

The UE receives the number of consecutive subframes by an RRC signaling or a MAC signaling, or The UE sets the number of consecutive subframes to the known value.

For example, the Processing Time includes the subframes #m+1 to #m+j after drx-InactivityTimer is started at the subframe #m. The UE receives the value of j by an RRC or a MAC signaling or sets the value of j to the known value.

When the UE starts onDurationTimer and CQI-mask is setup by upper layers,

The UE checks whether the drxShortCycleTimer was started in the Preparation Time.

For example, if the drx-InactivityTimer was started by receiving a sudden PDCCH and expired within the Preparation Time, then the UE restarts the drxShort-CycleTimer within the Preparation Time.

If the UE started drxShortCycleTimer in the Preparation Time,

During the Processing Time, the UE considers that onDurationTimer is started unexpectedly.

During the Processing Time, the UE does not send CQI/PMI/RI/PTI reports on PUCCH and/or type-0-triggered SRS transmissions even though onDurationTimer is running.

Else,

The UE considers that onDurationTimer is started as expected.

The UE sends CQI/PMI/RI/PTI reports on PUCCH and/or type-0-triggered SRS transmissions during the Processing Time if onDurationTimer is running.

Text Proposal

A UE may optionally choose to not send CQI/PMI/RI/PTI reports on PUCCH and/or type-0-triggered SRS transmissions for up to 4 subframes following a PDCCH indicating a new transmission (UL or DL) received in subframe n–i, where n is the last subframe of Active Time and i is an integer value from 0 to 3. After Active Time is stopped due to the reception of a PDCCH or a MAC control element a UE may optionally choose to continue sending CQI/PMI/RI/PTI reports on PUCCH and/or SRS transmissions for up to 4 subframes. The choice not to send CQI/PMI/RI/PTI reports on PUCCH and/or type-0-triggered SRS transmissions is not applicable for subframes where onDuration-Timer, which is expected, is running and is not applicable for subframes n–i to n.

<End of Priority Document>

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for controlling uplink transmissions on discontinuous reception (DRX) operation, by a wireless device, in a wireless communication system, the method comprising:
configuring a channel quality indicator (CQI) masking which indicates that channel state information is to be reported on a physical uplink control channel (PUCCH) while an onDurationTimer is running;
determining, at a first subframe prior to a second subframe, whether or not the onDurationTimer is to be running at the second subframe according to whether or not a physical downlink control channel (PDCCH) is received at the first subframe; and
controlling the uplink transmissions so as not to report the channel state information on the PUCCH at the second subframe if the onDurationTimer is determined, at the first subframe, to be not running at the second subframe,
wherein the channel state information includes at least one of a CQI, a precoding matrix index (PMI), a rank indicator (RI), or a precoding type indicator (PTI).

2. The method of claim 1, further comprising:
determining that a periodic sounding reference signal (SRS) transmission is not transmitted at the second subframe if the onDurationTimer is determined, at the first subframe, to be not running at the second subframe.

3. The method of claim 1, wherein the determining whether or not the onDurationTimer is to be running at the second subframe comprises at least one of:
checking that a drxShortCycleTimer was started in a preparation time defined as a certain number of consecutive subframes before the onDurationTimer is running; and
checking that the second subframe is in a processing time defined as a certain number of consecutive subframes after a drx-Inactivity timer was started when the drxShortCycleTimer was started in the preparation time.

4. The method of claim 3, further comprising:
controlling the uplink transmissions so as to report the channel state information on the PUCCH or a periodic sounding reference signal (SRS) at the second subframe when the drxShortCycleTimer was not started in the preparation time.

5. The method of claim 3, wherein the preparation time and the processing time are configured by one of a radio resource control (RRC) signaling, a medium access control (MAC) signaling, or a predetermined value.

6. The method of claim 5, wherein, by referring to the second subframe as subframe n, the preparation time includes subframes n−i to n−1 before the onDurationTimer is started at the subframe n, and the processing time includes subframes m+1 to m+j after the drx-Inactivity timer is started at a subframe m.

7. A wireless device in a wireless communication system, the wireless device comprising:
 a memory;
 a radio frequency (RF) unit; and
 a processor, operably coupled to the memory and the RF unit, that:
  configures a channel quality indicator (CQI) masking which indicates that channel state information is to be reported on a physical uplink control channel (PUCCH) while an onDurationTimer is running,
  determines, at a first subframe prior to a second subframe, whether or not the onDurationTimer is to be running at the second subframe according to whether or not a physical downlink control channel (PD-CCH) is received at the first subframe, and
  controls the uplink transmissions so as not to report the channel state information on the PUCCH at the second subframe if the onDurationTimer is determined, at the first subframe, to be not running at the second subframe,
 wherein the channel state information includes at least one of a CQI, a precoding matrix index (PMI), a rank indicator (RI), or a precoding type indicator (PTI).

8. The wireless device of claim 7, wherein the processor further determines that a periodic sounding reference signal (SRS) transmission is not transmitted at the second subframe if the onDurationTimer is determined, at the first subframe, to be not running at the second subframe.

9. The wireless device of claim 7, wherein the determining whether or not the onDurationTimer is to be running at the second subframe comprises at least one of:
 checking that a drxShortCycleTimer was started in a preparation time defined as a certain number of consecutive subframes before the onDurationTimer is running; and
 checking that the second subframe is in a processing time defined as a certain number of consecutive subframes after a drx-Inactivity timer was started when the drx-ShortCycleTimer was started in the preparation time.

10. The wireless device of claim 9, wherein the processor further controls the uplink transmissions so as to report the channel state information on the PUCCH or a periodic sounding reference signal (SRS) at the second subframe when the drxShortCycleTimer was not started in the preparation time.

11. The wireless device of claim 9, wherein the preparation time and the processing time are configured by one of a radio resource control (RRC) signaling, a medium access control (MAC) signaling, or a predetermined value.

12. The wireless device of claim 11, wherein, by referring to the second subframe as subframe n, the preparation time includes subframes n−i to n−1 before the onDurationTimer is started at the subframe n, and the processing time includes subframes m+1 to m+j after the drx-Inactivity timer is started at a subframe m.

* * * * *